US008613128B2

(12) United States Patent  (10) Patent No.: US 8,613,128 B2
Moerke et al.  (45) Date of Patent: Dec. 24, 2013

(54) PUSH-IN FASTENER ASSEMBLY

(75) Inventors: Benjamin H. Moerke, Chippewa Falls, WI (US); Hideki Kanie, Nisshin (JP)

(73) Assignee: Illinois Tool Works Inc., Glenview, IL (US)

( * ) Notice: Subject to any disclaimer, the term of this patent is extended or adjusted under 35 U.S.C. 154(b) by 17 days.

(21) Appl. No.: 13/505,333

(22) PCT Filed: Nov. 1, 2010

(86) PCT No.: PCT/US2010/054979
§ 371 (c)(1),
(2), (4) Date: May 1, 2012

(87) PCT Pub. No.: WO2011/053915
PCT Pub. Date: May 5, 2011

(65) Prior Publication Data
US 2012/0213609 A1  Aug. 23, 2012

Related U.S. Application Data

(60) Provisional application No. 61/527,193, filed on Nov. 2, 2009.

(51) Int. Cl.
F16B 21/00 (2006.01)
(52) U.S. Cl.
USPC ................ 24/453; 24/297; 411/347; 411/509
(58) Field of Classification Search
USPC .............................. 24/297, 453; 411/347, 509
See application file for complete search history.

(56) References Cited

U.S. PATENT DOCUMENTS

| 4,927,287 | A | * | 5/1990 | Ohkawa et al. ............ 403/408.1 |
|-----------|---|---|--------|------------------------------------|
| 5,301,396 | A |   | 4/1994 | Benoit |
| 6,305,055 | B1 |  | 10/2001 | Castro |
| 6,974,292 | B2 |  | 12/2005 | Hansen |
| 7,188,393 | B2 |  | 3/2007 | Kawai |
| 2002/0176762 | A1 | * | 11/2002 | Moerke ........................ 411/45 |
| 2006/0099051 | A1 |  | 5/2006 | Moerke |
| 2006/0242802 | A1 | * | 11/2006 | Scroggie ....................... 24/297 |
| 2008/0298925 | A1 |  | 12/2008 | Shinozaki |

FOREIGN PATENT DOCUMENTS

CN 2846844 Y 12/2006
EP 1630426 A2 3/2006

OTHER PUBLICATIONS

ISR for PCT/US2010/054979 dated Feb. 15, 2011.

* cited by examiner

*Primary Examiner* — Robert J Sandy
*Assistant Examiner* — David Upchurch
(74) *Attorney, Agent, or Firm* — Mark W. Croll; Paul F. Donovan

(57) ABSTRACT

A push-in fastener assembly includes a fastener having deflectable retainer wings and a guide ring slidable over the retainer wings. The retainer wings and/or the guide ring are shaped to reduce interference of the guide ring sliding over the retainer wings when distorted by the retainer wings. Structure is provided for more secure preassembly of the guide ring on the fastener.

20 Claims, 4 Drawing Sheets

PUSH-IN FASTENER ASSEMBLY

CROSS-REFERENCE TO RELATED APPLICATIONS

The present application claims the benefits of U.S. Provisional Application Ser. No. 61/257,913 filed Nov. 2, 2009.

FIELD OF THE INVENTION

The present invention relates generally to fasteners, and, more specifically, to push-in fasteners used for attaching one component to another component, such as, for example, panels to panels, other items and things to panels and the like by inserting the fastener through an aperture in at least one of the components, with the fastener having resilient retaining members that bend inwardly during insertion through the component, and that expand or rebound outwardly when inserted fully through the component.

BACKGROUND OF THE INVENTION

Different types of push-in fasteners are known for use in different environments and for different purposes. A common feature in push-in fasteners is a resiliently bendable or deflectable retention member that bends inwardly when the fastener is inserted through a hole or aperture and that rebounds outwardly to hold the fastener when the fastener is fully inserted. Inward bending of the retention member can be caused by the sliding engagement of the member against the aperture surface in the component as the fastener is inserted through the component.

U.S. Pat. No. 5,301,396 discloses a fastener assembly with a compression member. The fastener assembly includes a fastener having a shank with a head at one end of the shank, with the shank comprising a plurality of resilient legs integrally formed with the head and mutually connected opposite the head at a distal end of the fastener. The legs are bowed outwardly to define a maximum diameter larger than an aperture size in a panel or panels or component or components through which the fastener will be inserted. Accordingly, during insertion, the legs deflect inwardly so as to pass through the aperture(s) and rebound outwardly as the maximum diameter portion passes through the aperture(s). The fastener assembly further includes a compression ring having a central tapered aperture with a diameter slightly less than the diameter of the aperture in the panel(s) or component(s) through which the fastener is inserted. When used as a part of a fastener assembly, the ring rests against the panel(s) or component(s) through which the fastener is inserted as the fastener is inserted. The ring provides contact against the legs, compressing the legs for passing through both the ring and the panel(s) or component(s). The slightly smaller diameter of the aperture in the ring holds the legs away from sliding contact against the edge of the aperture in the panel or component, which may be abrasive to the material of the fastener. Accordingly, the ring is useful in reducing drag or abrasion that may occur if the aperture of the panel or component is harsh or abrasive to the material of the fastener. The ring and fastener can be made of purposely selected materials and shaped in a manner so as to slide easily against each other, thereby reducing insertion force required when compared to the force required if the legs were to slide directly against the aperture(s) of the panel(s) or component(s) in which the fastener is used. However, due to the shape and positions of the legs in the ring, more drag occurs in some areas of contact against the ring than in other areas of contact, or in areas where the legs do not contact the ring. According, the shape of the ring can become distorted during insertion, causing installation difficulties.

The aforedescribed fastener assembly has been used effectively to reduce insertion force even with fasteners that provide high retention by having a relatively high extraction force requirement to remove the fastener. However, it is desirable to further reduce insertion force required in some situations, and/or to provide a pre-installation arrangement of the ring on the fastener that is secure during handling so that the ring does not become separated from the fastener inadvertently.

SUMMARY OF THE INVENTION

The present push-in fastener assembly provides an ergonomic, easily operated device for attaching one panel or component to another, such as automotive trim pieces to sheet metal of the vehicle. A guide ring reduces contact between the fastener and the panel during installation. Drag resulting from oblong deformation of the ring during installation is reduced by changes in the ring center aperture and modifications to the fastener retainer wings providing clearance to accommodate shape changes in the guide ring.

In one aspect of one form, a push-in fastener assembly is provided with a head and deflectable retainer wings connected to the head, the deflectable retainer wings defining a hip area of greatest diameter. A guide ring slidable along the deflectable retainer wings has an aperture of a diameter less than the hip area of greatest diameter. The deflectable retainer wings define a guide slot, and the guide ring defines a follower arm received in and slidable along the guide slot. At least one of the fastener and the guide ring has a structural shape modification providing clearance for accommodating distortion of the guide ring occurring as the guide ring slides over the hip area of greatest diameter.

In another aspect of a form thereof a push-in fastener assembly is provided with a fastener having a head and deflectable retainer wings connected to the head, the deflectable retainer wings defining a hip area of greatest diameter and a waist area of narrower diameter between the head and the hip area of greatest diameter. A guide ring is slidable along the deflectable retainer wings and has an aperture of a diameter less than the hip area of greatest diameter. The deflectable retainer wings define first and second guide slots, and the guide ring defines first and second follower arms received in and slidable along the first and second guide slots. At least one of the fastener and the guide ring has structural shape modifications providing clearance for accommodating distortion of the guide ring occurring as the guide ring slides over the hip area of greatest diameter, the modifications providing clearance for narrowing of the aperture in the areas of the follower arms.

In a further aspect of a form thereof, a push-in fastener is provided with a fastener having a head and deflectable retainer wings connected to the head, the deflectable retainer wings defining a hip area of greatest diameter and a waist area of narrower diameter between the head and the hip area of greatest diameter. A guide ring slidable along the deflectable retainer wings has an aperture of a diameter less than the hip area of greatest diameter. The deflectable retainer wings define first and second guide slots, and the guide ring defines first and second follower arms received in and slidable along the first and second guide slots. At least one of the retainer wings has clearance pocket adjacent one of the guide slots extending through the hip area of greatest diameter.

Other features and advantages of the invention will become apparent to those skilled in the art upon review of the following detailed description, claims and drawings in which like numerals are used to designate like features.

Figure 1:
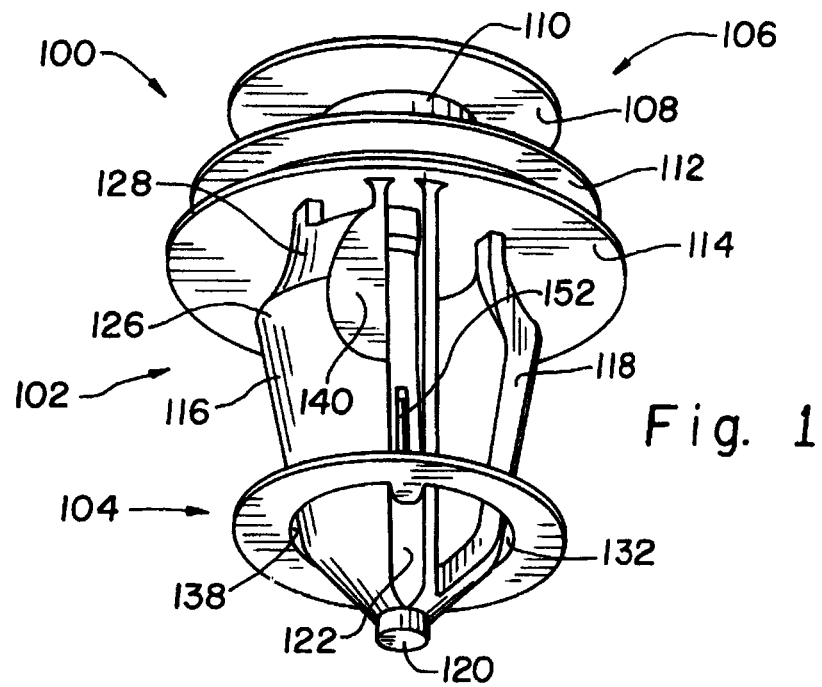
FIG. 1 is a perspective view of a push-in fastener assembly.
Figure 2:
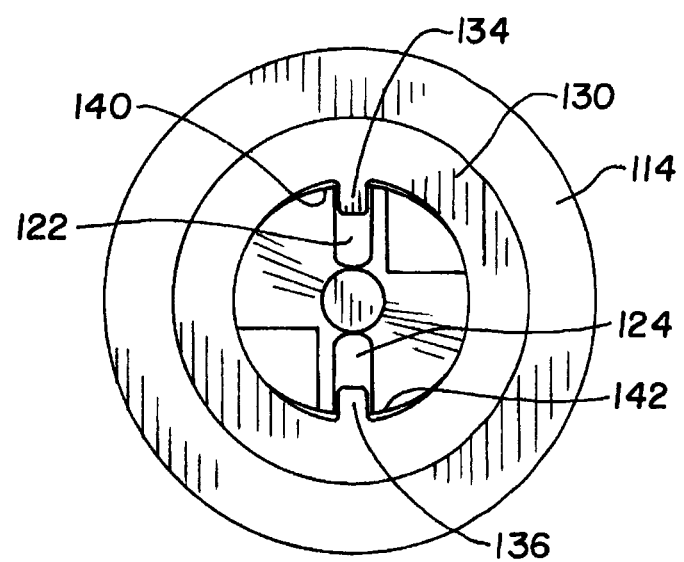
FIG. 2 is a plan view of the push-in fastener assembly shown from the bottom of the assembly as shown in FIG. 1.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings, FIG. 1 illustrates a fastener assembly 100 including a fastener 102 and a guide ring 104. Fastener assembly 100 can be of different shapes and configurations within the concepts and principles described herein. Fastener assembly 100, including both fastener 102 and guide ring 104 can be made of various different materials, including various types of plastics. Fastener 102 and guide ring 104 can be made of the same material or of different materials.

Fastener 102 includes a head 106, including a cap 108 and a neck 110, and may further include one or more flange 112, 114, and in the exemplary embodiment shown in FIG. 1 includes two flanges 112, 114. Fastener 102 further includes a plurality of resiliently deflectable retainer wings 116, 118 projecting from the head 106. It should be understood that fastener 102 can include more than two retainer wings 116, 118. Retainer wings 116, 118 are mutually connected at a distal end or distal tip 120 remote from head 106. Retainer wings 116, 118 are bent or deflected inwardly as fastener 102 is inserted through a hole or aperture in a panel or component to which the fastener will be affixed. When fastener 102 is fully inserted, retainer wings 116, 118 rebound outwardly to overlap the panel or component on an opposite side thereof from head 106. Accordingly, fastener 102 is secured in the panel or component and head 106 can be connected to still another object. It should be understood that the connection of head 106 to another object can be performed before or after fastener 102 is inserted through a hole or aperture of a panel or component and connected thereto via the deflection and outward rebound of retainer wings 116, 118.

Retainer wings 116, 118 define at least one guide slot 122, and in the embodiment shown retainer wings 116, 118 define two guide slots 122, 124 extending from distal end or distal tip 120 to flange 114. Retainer wings 116, 118 collectively define the widest diameter at a hip area 126 from which retainer wings 116, 118 taper inwardly toward distal end or distal tip 120. Between hip area 126 and flange 114 retainer wings 116, 118 narrow in a waist area 128.

Guide ring 104 is an annular body 130 defining an aperture 132 and at least one follower arm 134 projecting inwardly from annular body 130 and received in guide slot 122. In the exemplary embodiment shown, guide ring 104 defines two diametrically opposed follower arms 134, 136 that project inwardly from an inner contact surface 138 of annular body 130. Follower arms 134, 136 are received in guide slots 122, 124, respectively.

During installation of fastener assembly 100, guide ring 104 slides along retainer wings 116, 118 as the fastener assembly is inserted in an aperture of a component, with guide ring 104 contact surface 138 thereby contacting retainer wings 116, 118 to cause inward deflection of retainer rings 116, 118 until guide ring 104 reaches waist area 128 above hip area 126. During insertion, follower arms 134, 136 slide along guide slots 122, 124 to restrict rotation of ring 104 relative to retainer wings 116, 118. As guide ring 104 passes over the widest area defined by retainer wings 116, 118, including hip area 126, the generally annular shape of annular body 130 distorts, pulling body 130 inwardly in the general areas of follower arms 134, 136.

Fastener assembly 100 is provided with structural modifications for accommodating distortion of guide ring 104 and reducing sliding interference between fastener 102 and guide ring 104. A first distortion accommodating structural modification includes chamfers, hollows or ring clearance pockets 140, 142 provided in one or both retainer wings 116, 118 adjacent guide slots 122, 124 in a limited region leading into and away from maximum diameter hip area 126. Chamfers, hollows or ring clearance pockets 140, 142 are depressions of reduced diameter with respect to radially adjacent areas. Accordingly, the increased clearance reduces drag of ring 104 against retainer wings 116, 118 in the areas of chamfers, hollows or ring clearance pockets 140, 142 even as aperture 132 distorts and annular body 130 is drawn inwardly at follower arms 134, 136 while fastener assembly 100 is being inserted and guide ring 104 slides along retainer wings 116, 118 and over hip area 126.

Figure 3:
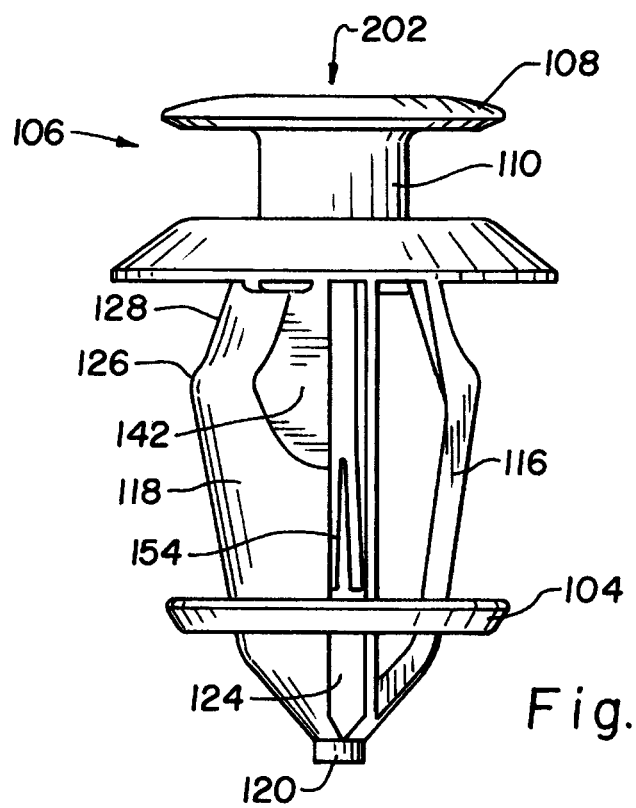
FIG. 3 is an elevational view of the push-in fastener assembly shown in FIG. 1.
Figure 4:
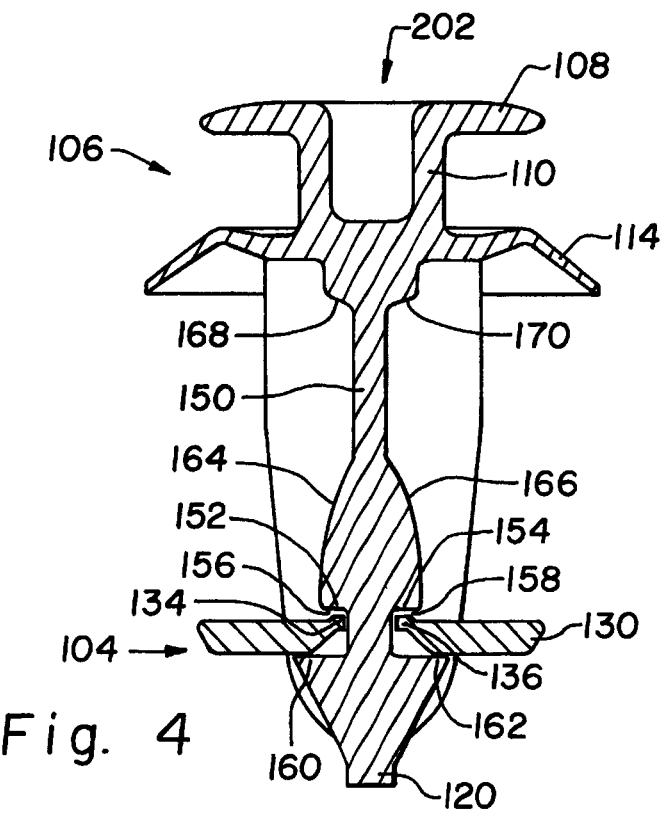
FIG. 4 is a vertical cross-sectional view of the push-in fastener assembly taken along line 4-4 of FIG. 3.

A further fastener 202 is shown in FIG. 3. Fastener 202 is similar to fastener 102 except that fastener 202 has a single flange 114. Accordingly, structures of fastener 202 that are similar to previously described structures of fastener 102 have been identified with the same reference numbers used previously. To secure pre-assembly of guide ring 104 on fastener 102, as shown most clearly in FIGS. 4 and 5, a center post 150 is provided with catches or latches 152, 154 defining pockets 156, 158 with bottom members 160, 162. Follower arms 134, 136 are positioned in pockets 156, 158 during preassembly and are retained in pockets 156, 158 and supported by bottom members 160, 162 during handling. Latches 152, 154 and bottom members 160, 162 positioned on opposite sides of follower arms 134, 136 inhibit both tilting of guide ring 104 and bending of follower arms 134, 136 during handling so that guide ring 104 does not become dislodged easily from fastener 102 inadvertently. During initial insertion of fastener assembly 100 into a hole provided in a component, follower arms 134, 136 deflect downwardly as head 106 is pushed toward guide ring 104 and latches 152, 154 are pushed against follower arms 134, 136. Follower arms 134, 136 thereby release from pockets 156, 158. Catches or latches 152, 154 are provided with smooth transition surfaces 164, 166 inwardly from pockets 156, 158 toward center post 150. Accordingly, follower arms 134, 136 can bend downwardly to slide past latches 152, 154 and transition smoothly along surfaces 164, 166 until reaching non-deflected positions along center post 150, without follower arms 134, 136 rebounding abruptly and without generating significant sound which could be mistakenly interpreted as the final snapping sound heard upon full insertion of the fastener assembly. Installers of the fastener assembly will not be misled by an audible sound mistakenly interpreted as the fastener having reached full installation.

Anti-vibration stops 168, 170 project outwardly from center post 150 beneath head 106 and confront and engage follower arms 134, 136 of guide ring 104 when fastener 202 is fully installed and guide ring 104 reaches waist area 128. Anti-vibrations stops 168, 170 retard vibration and undesirable noise that may result otherwise from looseness of guide ring 104 when fastener 202 is installed in some panel thicknesses.

Figure 5:
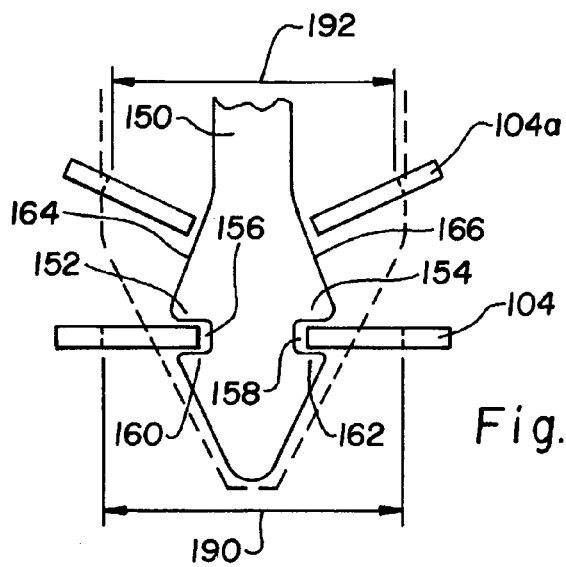
FIG. 5 is a fragmentary view illustrating to alternative positions for a guide ring of the push-in fastener assembly.
Figure 6:
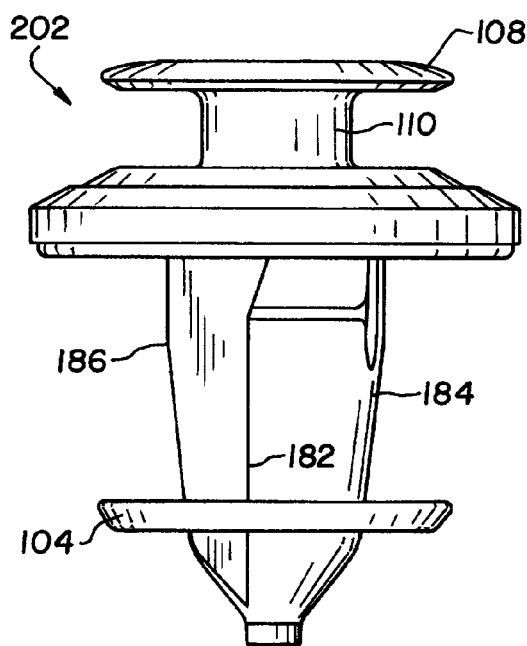
FIG. 6 is a further elevational view of the push-in fastener assembly.
Figure 7:
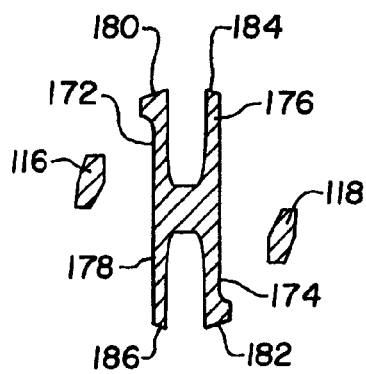
FIG. 7 is a horizontal cross-sectional view of the push-in fastener assembly.

As a further structural modification for accommodating distortion of guide ring 104, to further overcome increased drag that would otherwise occur as guide ring 104 distorts due to drag against retainer wings 116, 118; retainer wings 116, 118 and center post 150 are provided in a somewhat H-like configuration. Diagonally legs 172, 174 are connected to retainer wings 116, 118, respectively. Two other diagonally opposed legs 176, 178 are free from direct connection to retainer wings 118, 120. Outer edge surfaces 180, 182, 184, 186 of legs 172, 174, 176, 178 are angularly arranged or chamfered so as to provide increased clearance along the axial length of the fastener, at least along the length thereof in which guide ring 104 remains cupped due to the expanded surface along transition surfaces 164, 166. FIG. 5 illustrates non-distorted guide ring 104 having a first diameter 190 of aperture 132 and a second, narrower diameter 192 of aperture 132 with guide ring 104 and a second position illustrated as 104a. Chamfering or angling the confronting edges accommodates the narrower diameter while guide ring 104 remains cupped.

It is preferred to maintain a full, uncompromised diameter for fastener 102 in the area where the fastener engages a panel or other structure at the fully installed position for good centering in the hole in the panel or other structure. However, structural modifications of the fastener in other areas can reduce interference in the those areas contacted by guide ring 104 while guide ring 104 remains distorted either through oblong distortion caused by retainer wings 116, 118 or cupping caused by transition surfaces 164, 166.

Figure 8:
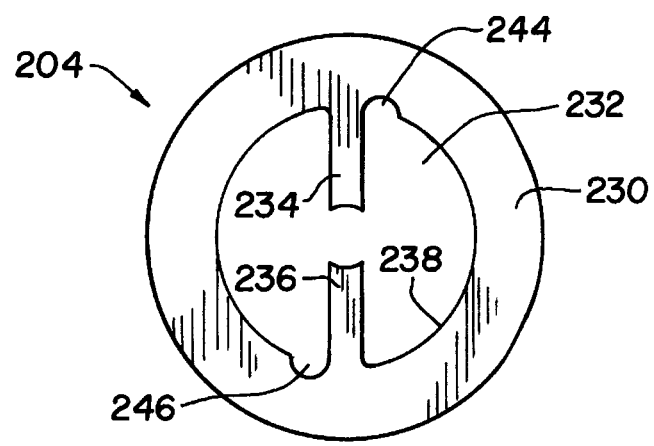
FIG. 8 is a plan view of a further embodiment for a guide ring of a push-in fastener assembly.

In addition to or in place of the structural modifications of retainer wings 116, 118, structural accommodations also can be provided in guide rings of the fastener assembly. For example, notches or cutouts can be used in the guide ring. FIG. 8 illustrates a further embodiment of a guide ring 204 including an annular body 230 defining an aperture 232 and first and second follower arms 234, 236 projecting inwardly from a contact surface 238. Cutouts 244, 246 are provided in ring 204 adjacent follower arms 234, 236 to reduce the increased drag that would otherwise occur in those regions as the fastener assembly is inserted into components being connected together and ring 204 distorts.

Figure 9:
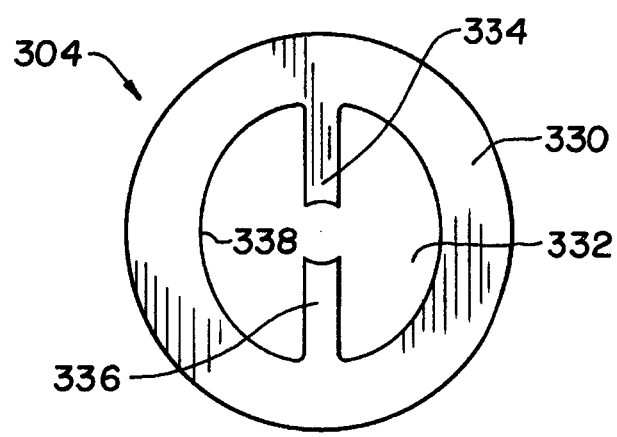
FIG. 9 is a plan view of yet another embodiment for a guide ring of a push-in fastener assembly.

FIG. 9 illustrates yet a further modification in which a guide ring 304 includes a body 330 defining an aperture 332 that is oblong rather than round. Follower arms 334, 336 project inwardly from a contact surface 338. Follower arms 334, 336 are provided on the major access of the oblong aperture 332. Decreased drag results even if the ring and distorts during insertion of the fastener.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A push-in fastener assembly, comprising:
   a fastener having a head and deflectable retainer wings connected to said head, said deflectable retainer wings defining a hip area of greatest diameter of said deflectable retainer wings;
   a guide ring slidable along said deflectable retainer wings and having an aperture of a diameter less than said hip area of greatest diameter;
   at least one of said deflectable retainer wings having a guide slot and said guide ring defining a follower arm received in and slidable along said guide slot; and
   at least one of said deflectable retainer wings and said guide ring having a structural shape modification providing clearance for accommodating distortion of said guide ring occurring as said guide ring slides over said hip area of greatest diameter.

2. The fastener assembly of claim 1, said structural shape modification including a clearance pocket adjacent said guide slot through said hip area of greatest diameter of at least one of said deflectable retainer wings.

3. The fastener assembly of claim 1, wherein said guide ring has a generally annular body and said structural shape modification including a cutout in said generally annular body of said guide ring adjacent said follower arm.

4. A push-in fastener assembly, comprising:
   a fastener having a head and deflectable retainer wings connected to said head, said deflectable retainer wings defining a hip area of greatest diameter of said deflectable retainer wings;
   a guide ring slidable along said deflectable retainer wings and having an aperture of a diameter less than said hip area of greatest diameter;
   at least one of said deflectable retainer wings having a guide slot and said guide ring defining a follower arm received in and slidable along said guide slot; and
   at least one of said deflectable retainer wings and said guide ring having a structural shape modification providing clearance for accommodating distortion of said guide ring occurring as said guide ring slides over said hip area of greatest diameter and said fastener including a center post defining a pocket and said follower arm of said guide ring disposed in said pocket in a pre-installation assembly of said fastener and said guide ring.

5. The fastener assembly of claim 4, wherein said center post includes a tapered transition surface from said pocket to said center post.

6. The fastener assembly of claim 1, said fastener including a center post having an H-shaped cross-sectional structure with chamfered outer edge surfaces.

7. The fastener assembly of claim 1, said guide ring having an oblong aperture defining a contact surface slidable over said retainer wings.

8. The fastener assembly of claim 7, said retainer wings defining first and second guide slots and said guide ring defining first and second follower arms received in and slidable along said first and second guide slots, said first and second follower arms provided on a major axis of said oblong aperture.

9. A push-in fastener assembly, comprising:
- a fastener having a head and deflectable retainer wings connected to said head, said deflectable retainer wings defining a hip area of greatest diameter of said deflectable retainer wings and a waist area of narrower diameter between said head and said hip area of greatest diameter;
- a guide ring having a generally annular body slidable along said deflectable retainer wings and having an aperture of a diameter less than said hip area of greatest diameter;
- said deflectable retainer wings each having a guide slot and said guide ring defining first and second follower arms received in and slidable along one of said guide slots; and
- at least one of said deflectable retainer wings and said guide ring having structural shape modifications providing clearance for accommodating distortion of said guide ring occurring as said guide ring slides over said hip area of greatest diameter, said modifications providing clearance for narrowing of said aperture in the areas of said follower arms.

10. The fastener assembly of claim 9, said structural shape modification including a clearance pocket in at least one of said deflectable retainer wings adjacent one of said guide slots through said hip area of greatest diameter.

11. The fastener assembly of claim 9, said structural shape modification including a clearance pocket in each said deflectable retainer wing adjacent each of said guide slots through said hip area of greatest diameter.

12. The fastener assembly of claim 9, said structural shape modification including a cutout in said generally annular body of said guide ring adjacent one of said follower arms.

13. The fastener assembly of claim 9, said structural shape modification including cutouts in said guide ring adjacent each of said follower arms.

14. A push-in fastener assembly, comprising:
- a fastener having a head and deflectable retainer wings connected to said head, said deflectable retainer wings defining a hip area of greatest diameter of said deflectable retainer wings and a waist area of narrower diameter between said head and said hip area of greatest diameter;
- a guide ring having an annular body slidable along said deflectable retainer wings and having an aperture of a diameter less than said hip area of greatest diameter;
- said deflectable retainer wings each having a guide slot and said guide ring defining first and second follower arms received in and slidable along one of said guide slots; and
- at least one of said deflectable retainer wings and said guide ring having structural shape modifications providing clearance for accommodating distortion of said guide ring occurring as said guide ring slides over said hip area of greatest diameter, said modifications providing clearance for narrowing of said aperture in the areas of said follower arms, said fastener including a center post defining first and second pockets, and one of said follower arms disposed in each of said pockets in a pre-installation assembly of said fastener and said guide ring.

15. The fastener assembly of claim 14, including tapered transition surfaces from each of said pockets to said center post.

16. The fastener assembly of claim 14, including first and second anti-vibration stops beneath said head, said anti-vibrations stops positioned to engage said follower arms upon full installation of said fastener.

17. The fastener assembly of claim 9, said fastener including a center post having an H-shaped cross-sectional structure with chamfered outer edge surfaces.

18. The fastener assembly of claim 9, said guide ring having an oblong aperture defining a contact surface slidable over said retainer wings.

19. The fastener assembly of claim 18, said first and second follower arms provided on a major axis of said oblong aperture.

20. A push-in fastener assembly as claimed in claim 1 wherein,
- said deflectable retainer wings each having a guide slot, and said guide ring defining follower arms received in and slidable along said guide slots; and
- at least one of said deflectable retainer wings having a clearance pocket adjacent one of said guide slots and extending through said hip area of greatest diameter.

* * * * *